No. 868,292.  
PATENTED OCT. 15, 1907.  
C. REDD.  
MACHINE FOR CLOSING AND SEALING THE TOP FLAPS OF CARTONS.  
APPLICATION FILED JULY 17, 1905.  
12 SHEETS—SHEET 3.

No. 868,292. PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 4.

Witnesses:
K. M. Cornwall
J. E. Sherry

Inventor:
Charlie Redd.
by Bitner, Niles & Hervey
Attys.

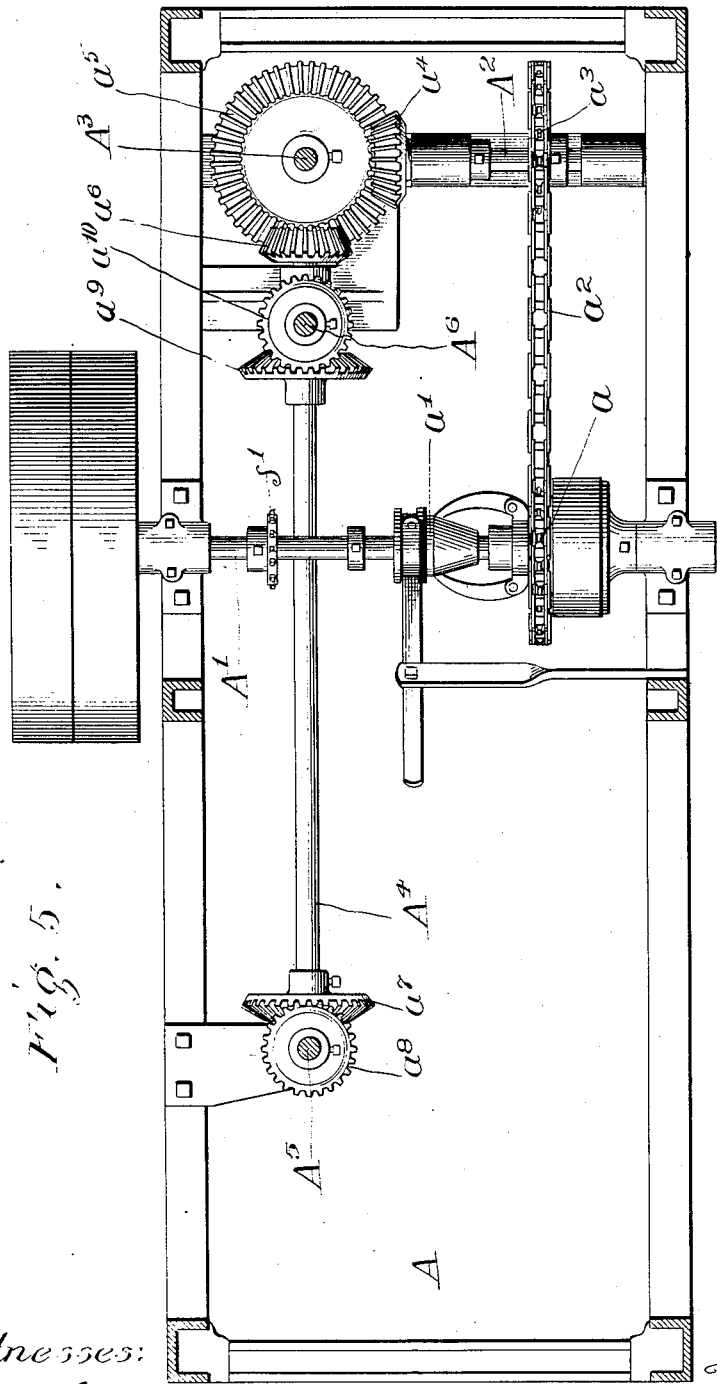

No. 868,292. PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 6.
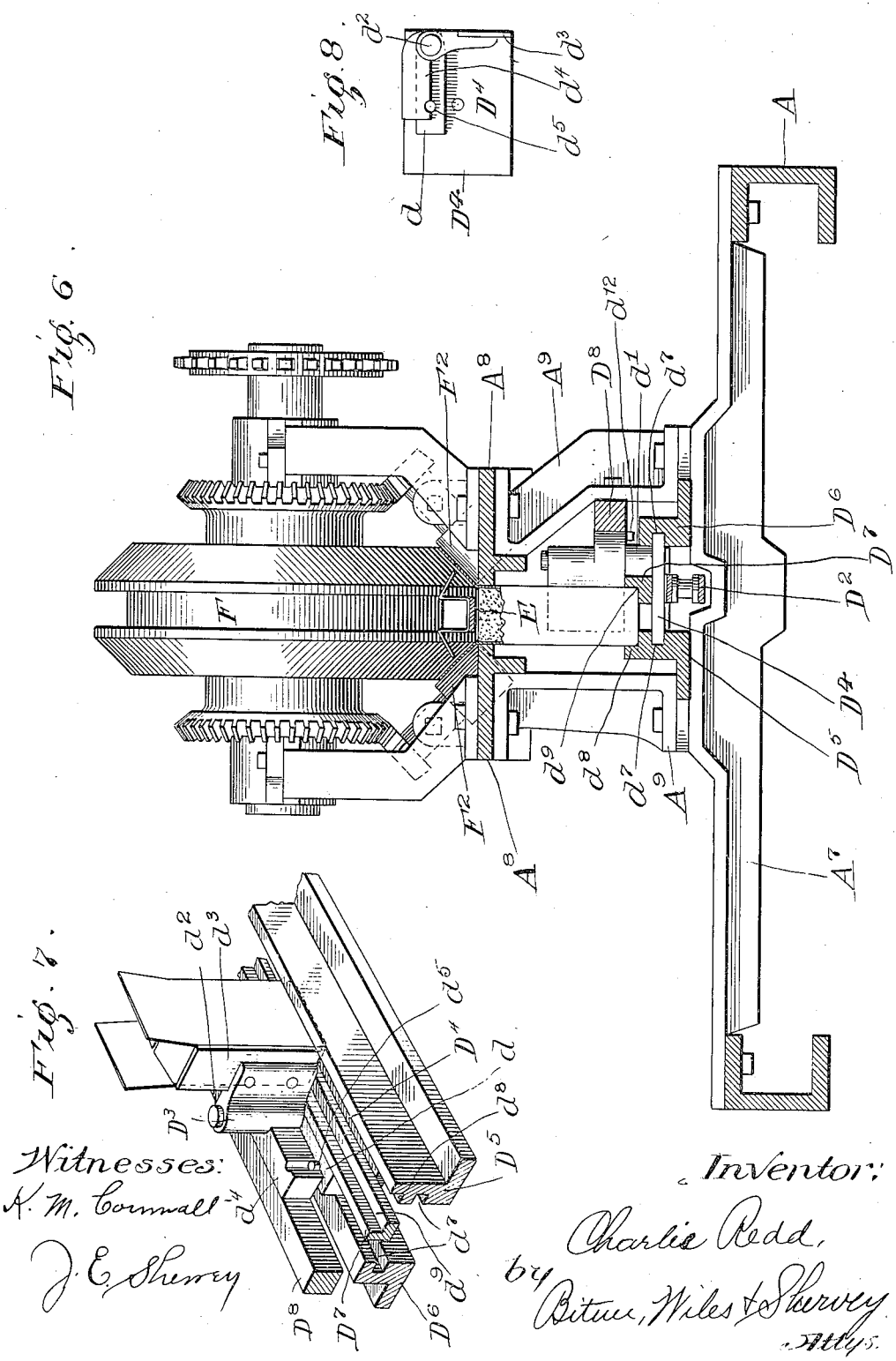
Witnesses:
K. M. Cornwall
J. E. Sherrey
Inventor:
Charlie Redd.
by Bitner, Wiles & Sherrey
Attys.

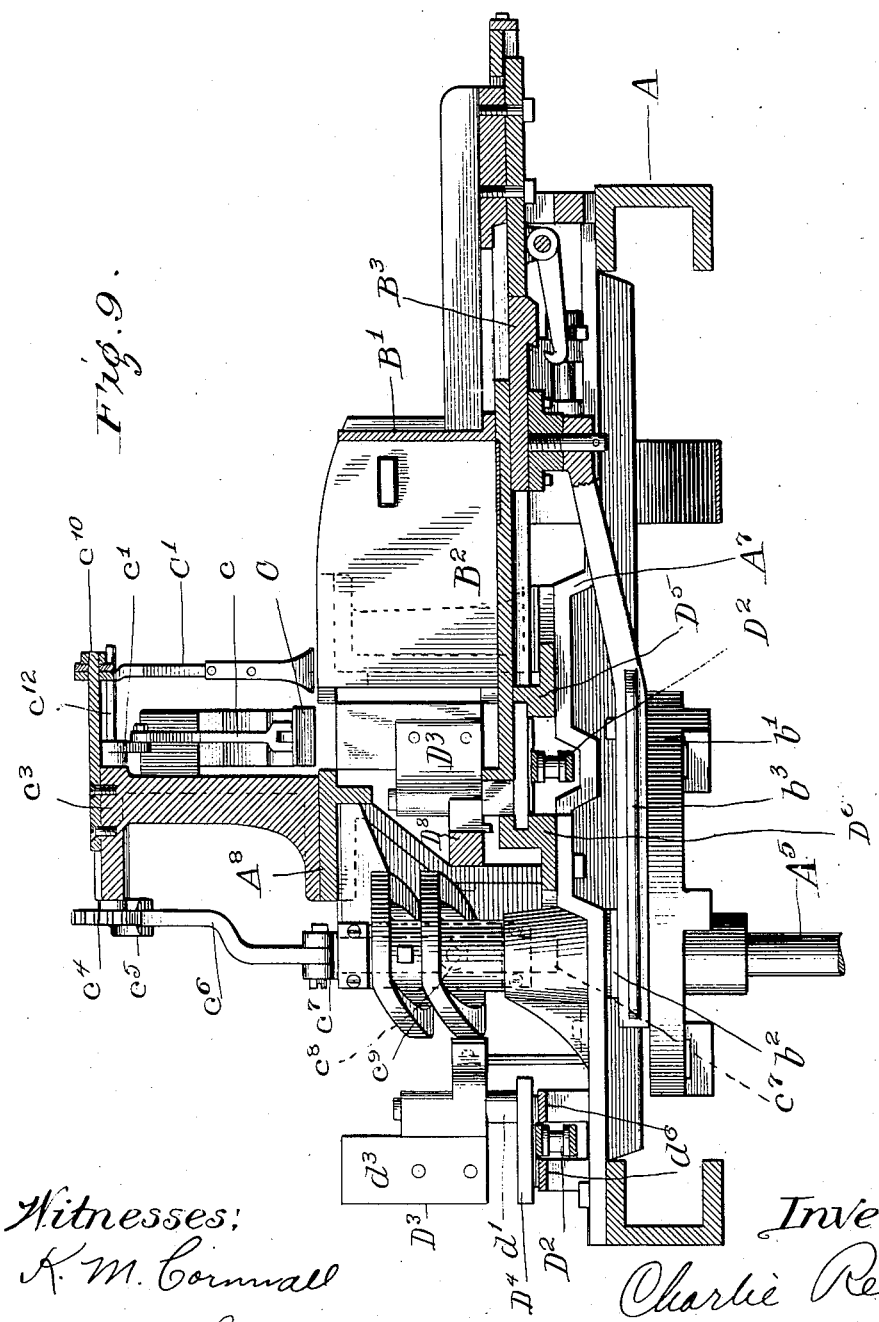

No. 868,292. PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 8.
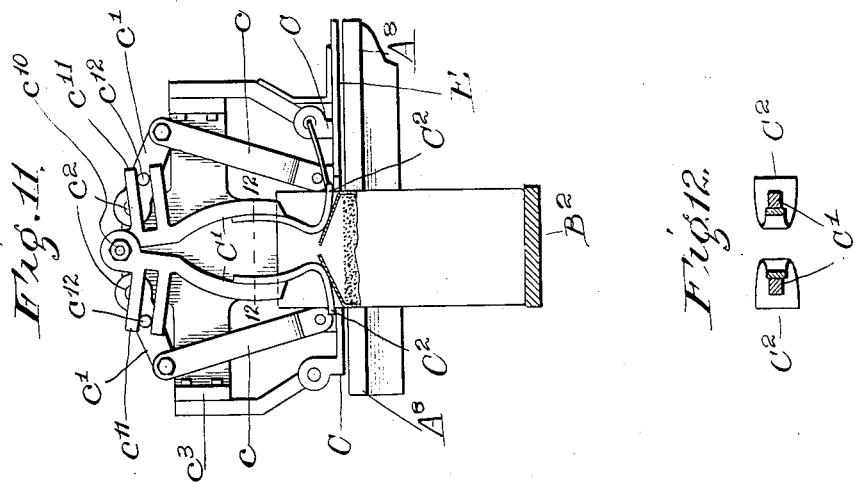
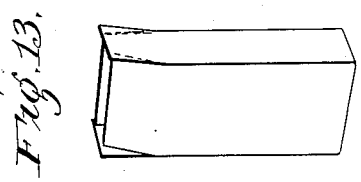
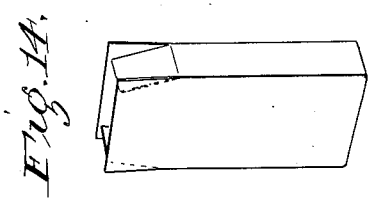
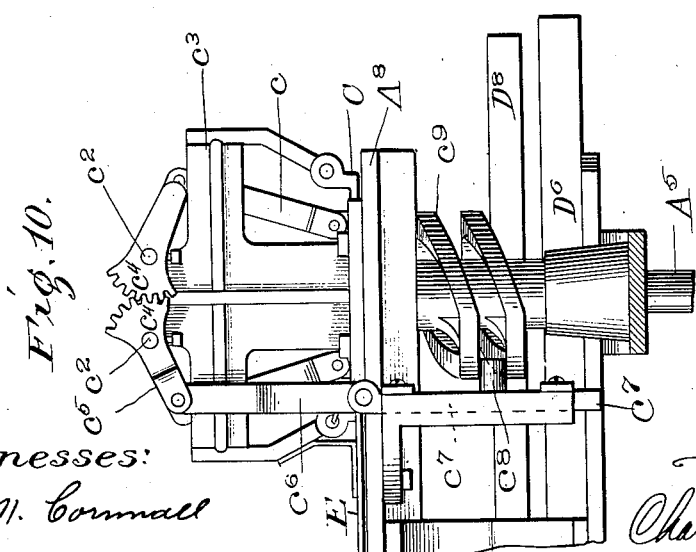
Witnesses:
K. M. Cornwall
J. E. Shewey
Inventor:
Charlie Redd,
by Bitner, Niles & Shewey
Attys No. 868,292.
PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 9.
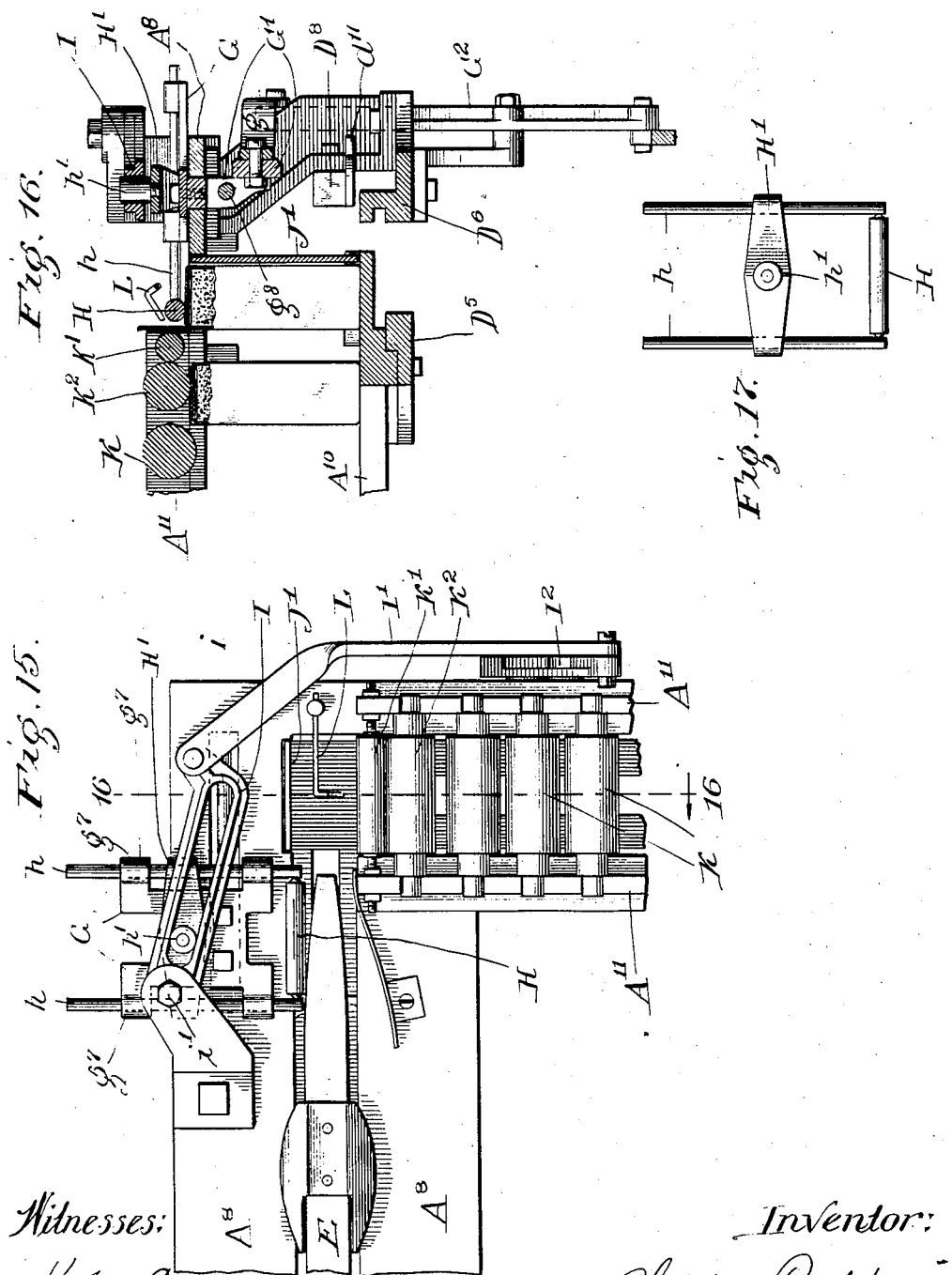

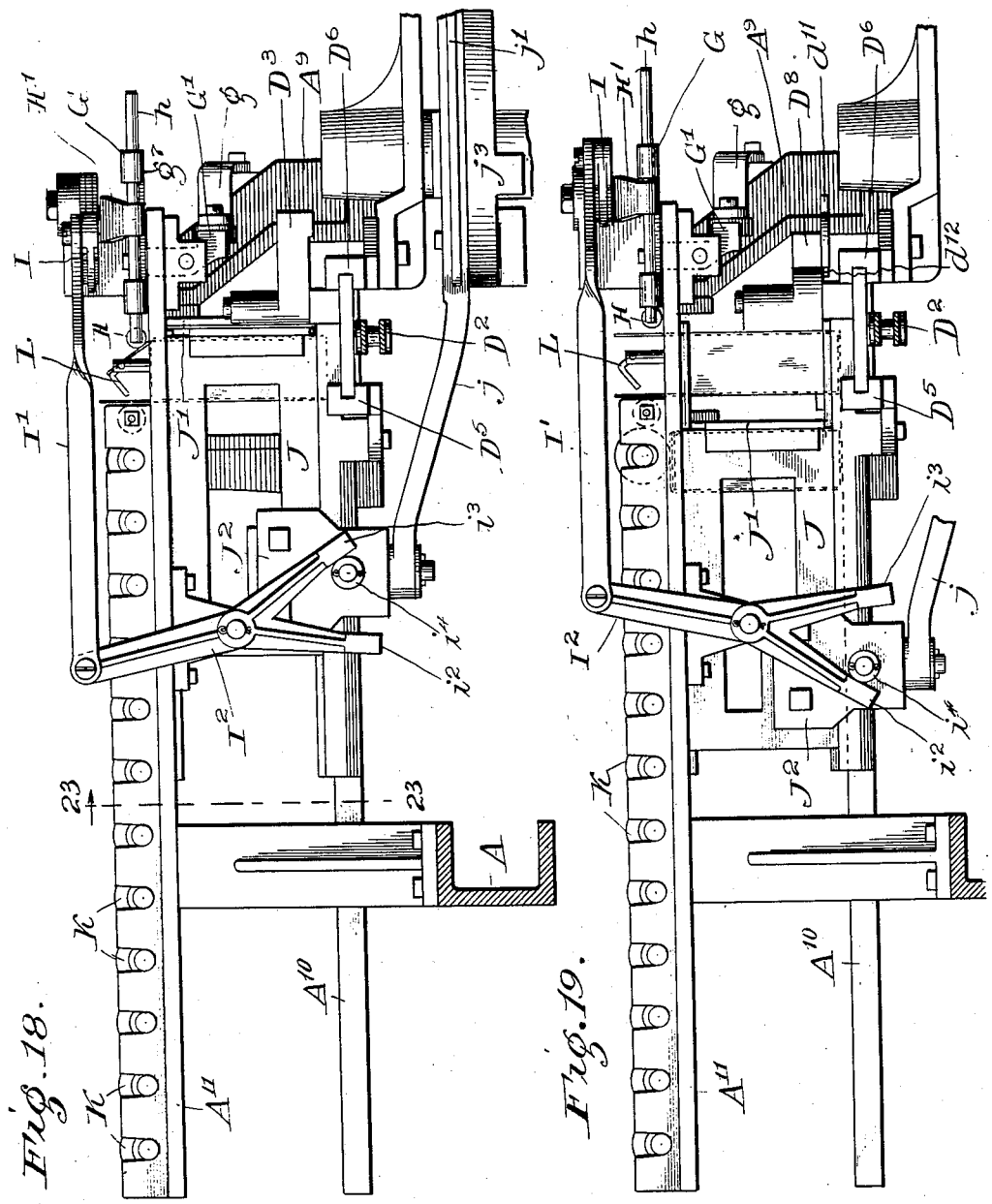

No. 868,292. PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 11.
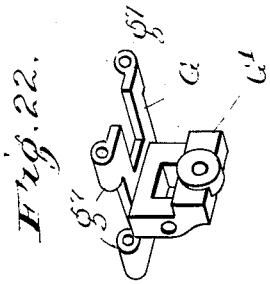
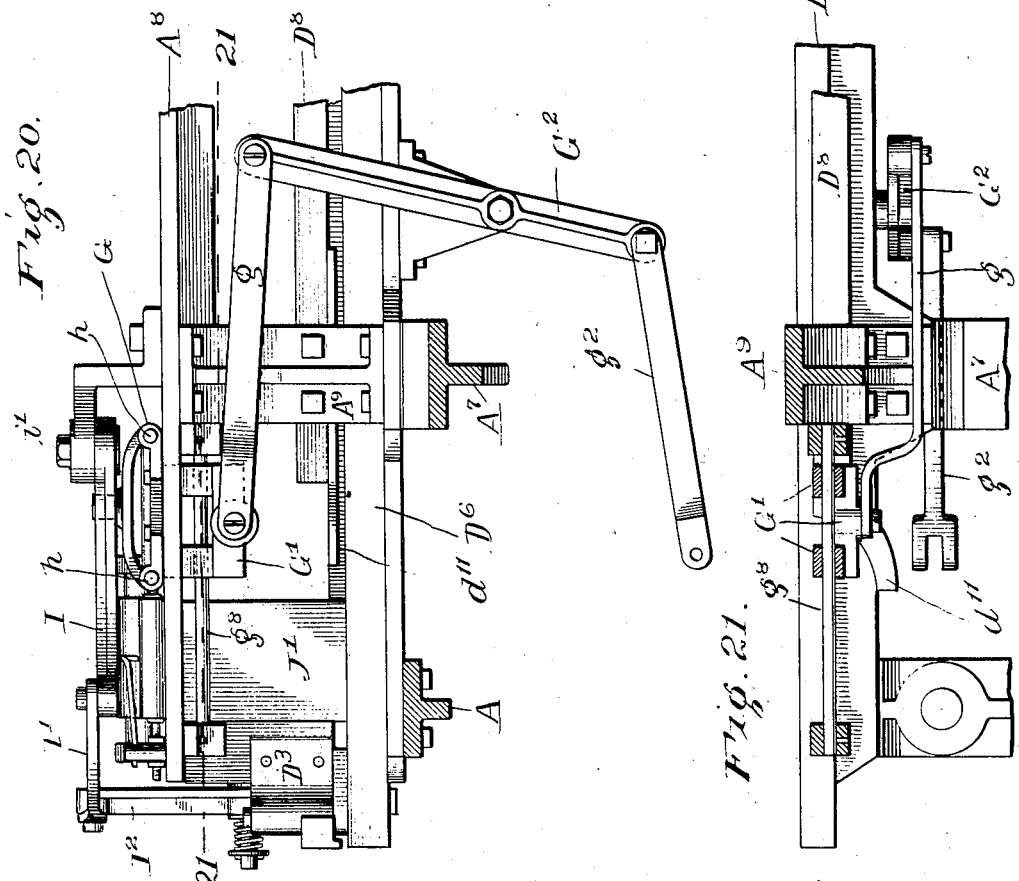
Witnesses:
Inventor:
Charlie Redd,
by Bitum, Wiles & Shervey.
Attys.

No. 868,292. PATENTED OCT. 15, 1907.
C. REDD.
MACHINE FOR CLOSING AND SEALING THE TOP FLAPS OF CARTONS.
APPLICATION FILED JULY 17, 1905.
12 SHEETS—SHEET 12.
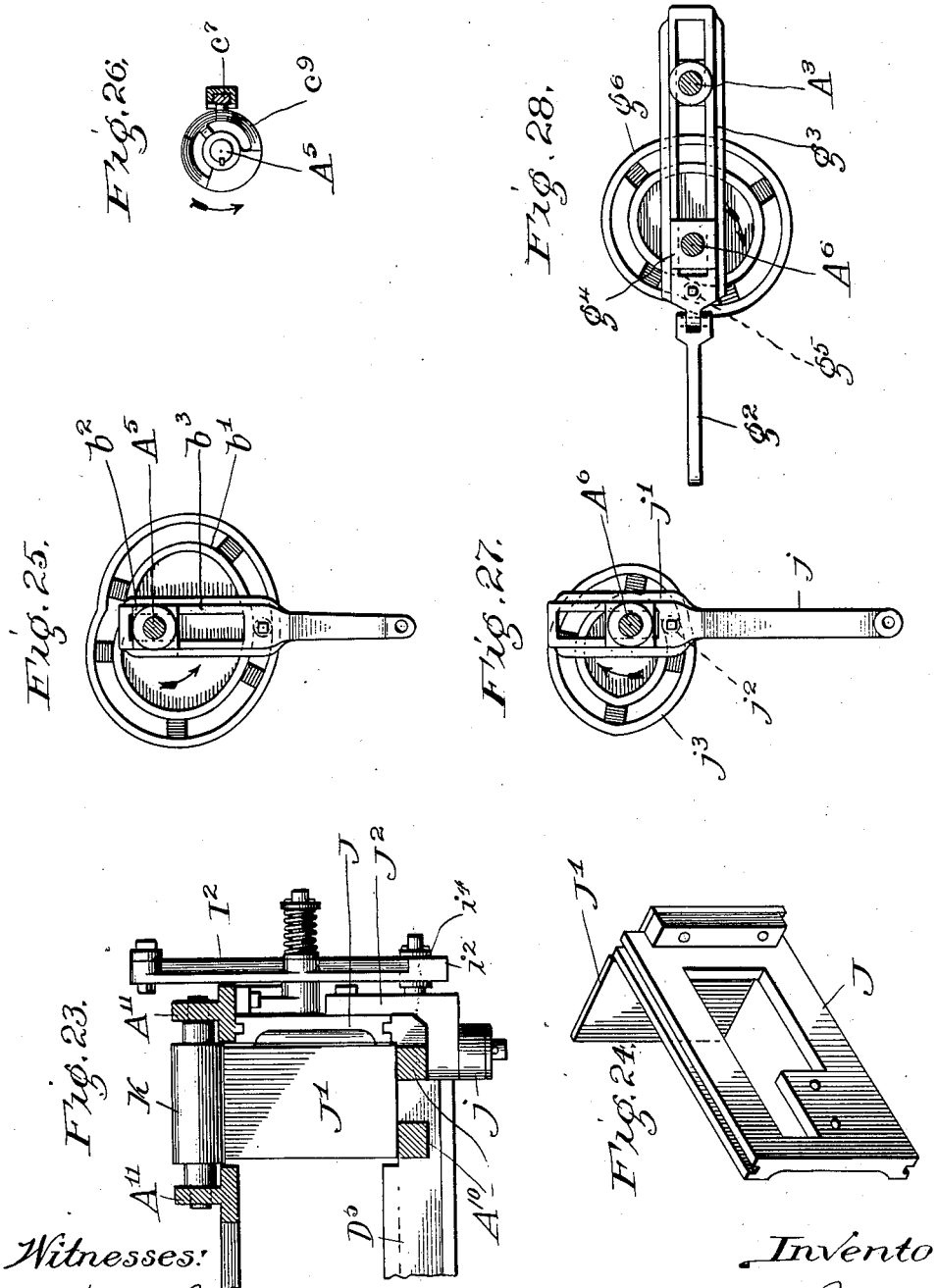

UNITED STATES PATENT OFFICE.

CHARLIE REDD, OF CHICAGO, ILLINOIS.

MACHINE FOR CLOSING AND SEALING THE TOP FLAPS OF CARTONS.

No. 868,292.　　　　Specification of Letters Patent.　　　　Patented Oct. 15, 1907.

Application filed July 17, 1905. Serial No. 269,940.

*To all whom it may concern:*

Be it known that I, CHARLIE REDD, a citizen of the United States of America, residing at Chicago, in the county of Cook and State of Illinois, have invented certain new and useful Improvements in Machines for Closing and Sealing the Top Flaps of Cartons, of which the following is a specification.

Figure 1:
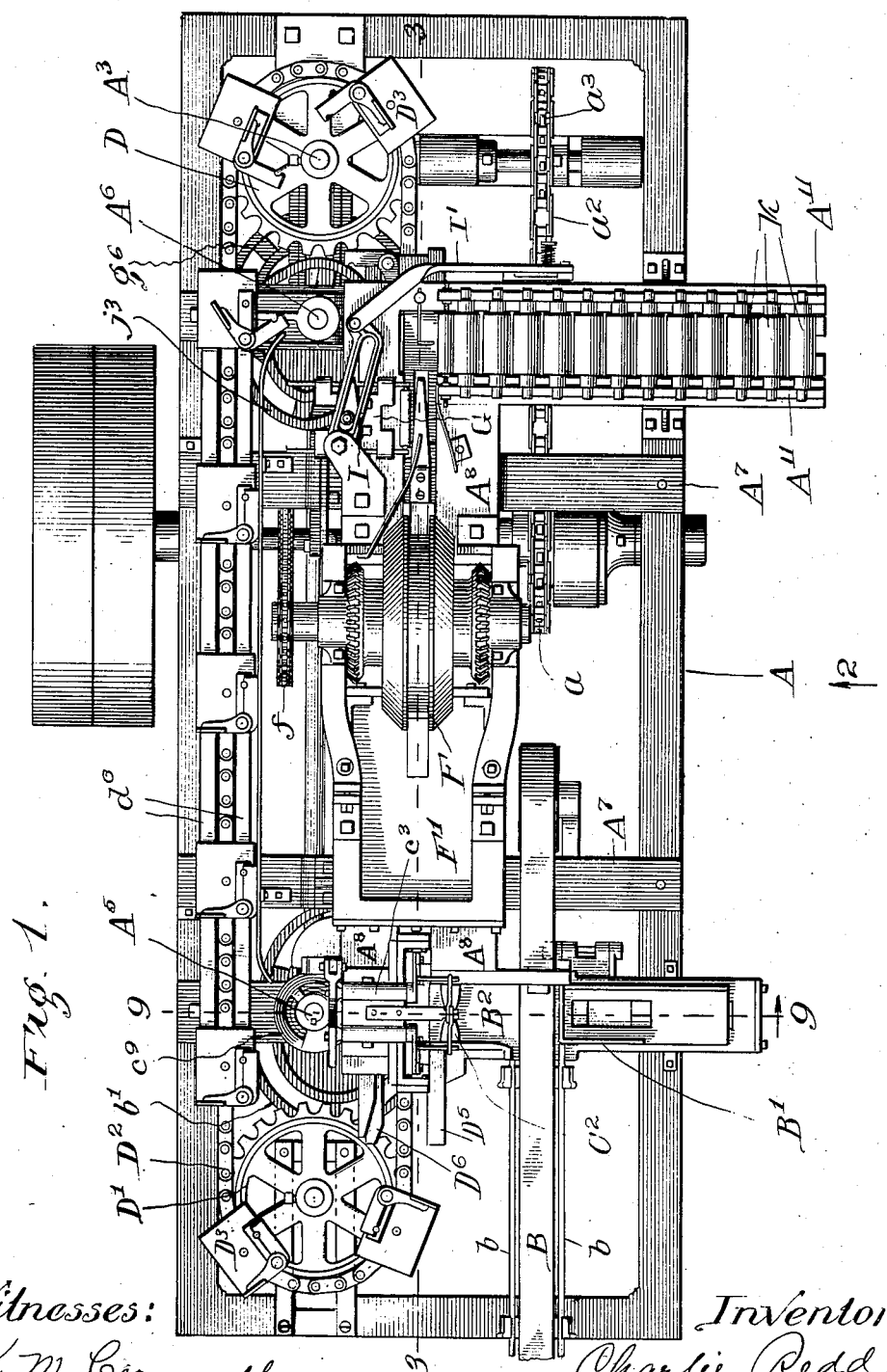
Figure 2:
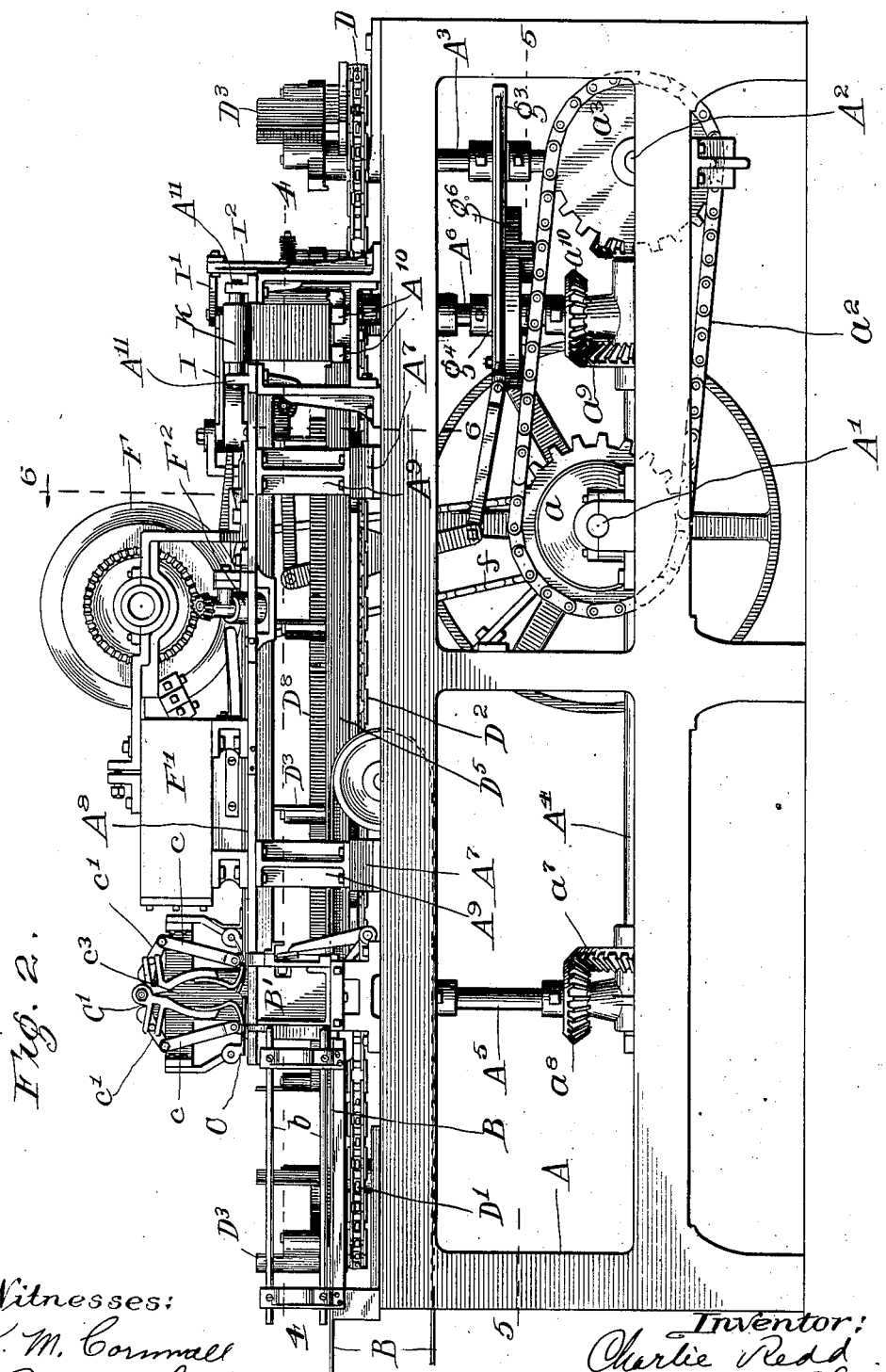
Figure 3:
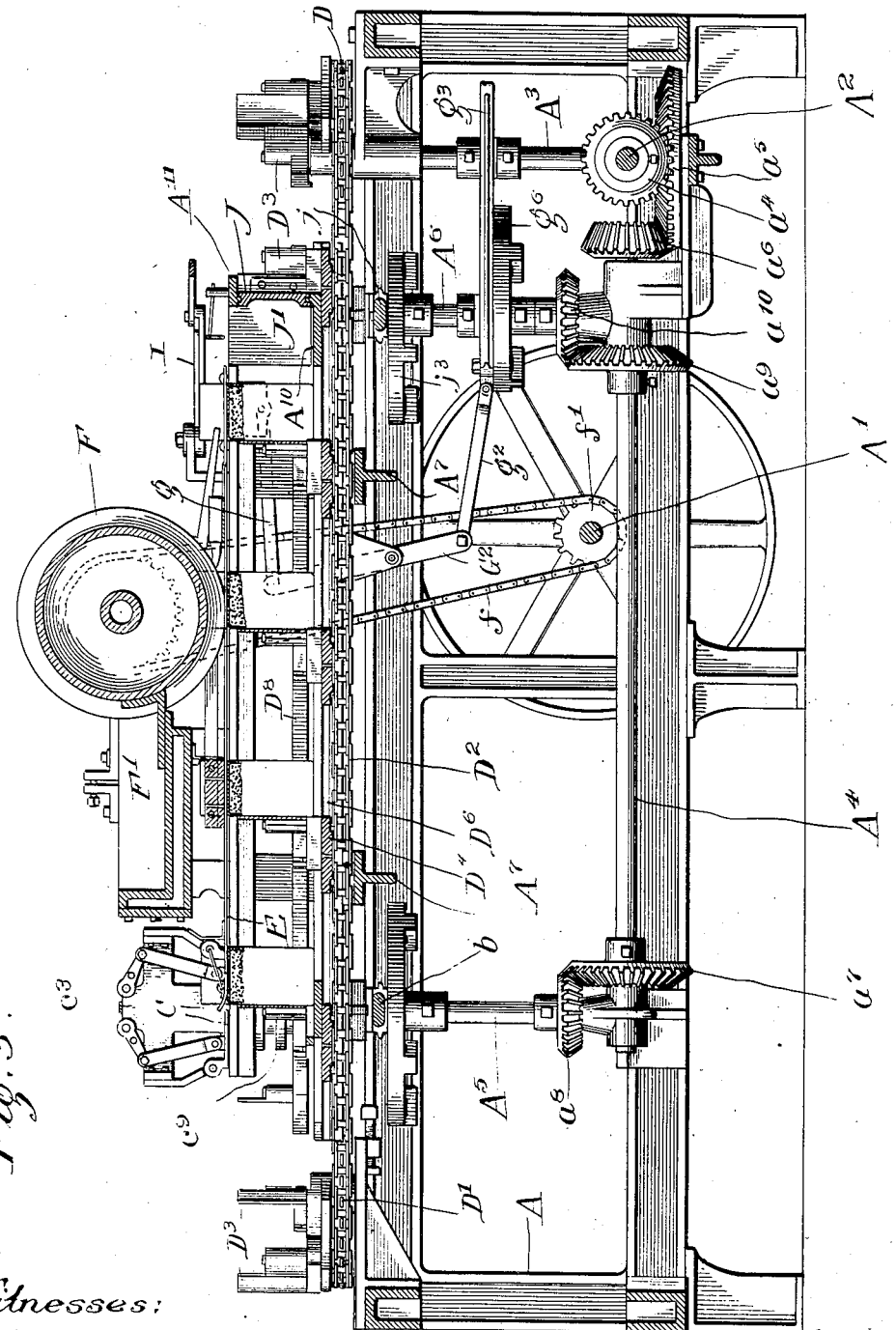
Figure 4:
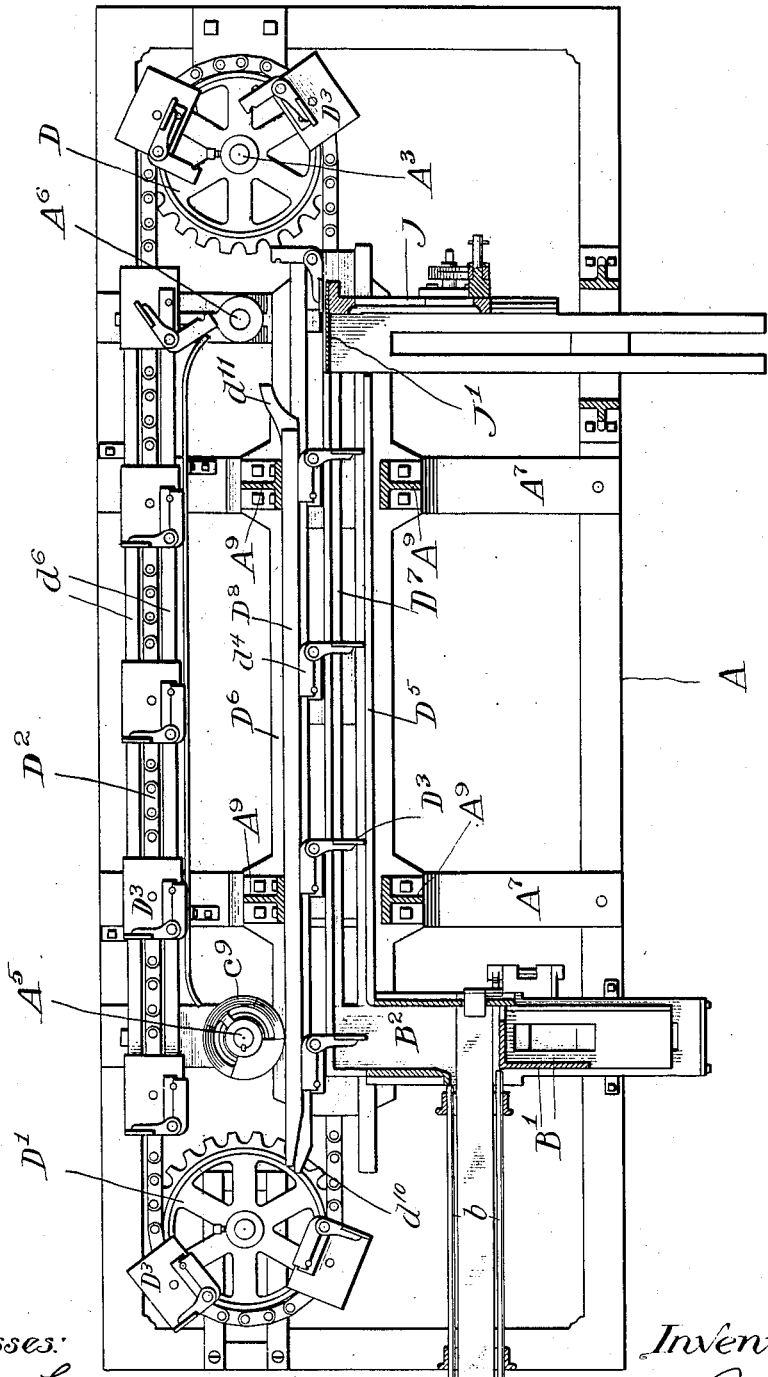

My invention relates to improvements in machines for closing and sealing the top flaps of cartons, and is fully described and explained in this specification, and shown in the accompanying drawings, in which Figure 1 is a plan view of the machine; Fig. 2 is a side view thereof, looking in the direction indicated by the arrow 2 in Fig. 1; Fig. 3 is a vertical longitudinal section taken in the line 3—3 of Fig. 1; Fig. 4 is a plan view of the frame, operating troughs and conveyer chain, the parts above being cut away in the line 4—4 of Fig. 2; Fig. 5 is a plan view illustrating the gearing, the parts above being cut away in the line 5—5 of Fig. 2; Fig. 6 is a view partly in end elevation, and partly in vertical cross-section, illustrating the main operating trough and gluing-wheel, the line of section being indicated at 6—6 in Fig. 2; Fig. 7 is a fragmental perspective view of the main operating trough and one of the carriers; Fig. 8 is a plan view of one of the package carriers; Fig. 9 is a view, partly in end elevation and partly in vertical cross-section of the feed chute and operating devices, the line of section being indicated at 9—9 in Fig. 1; Fig. 10 is a rear elevation of a fragment of the frame and the mechanism for holding the end, or front and rear flaps; Fig. 11 is a front view thereof; Fig. 12 is a horizontal section in the line 12—12 of Fig. 11; Fig. 13 is a perspective view of a carton; Fig. 14 is a similar view of said carton after the front and rear flaps have been tucked inside the side flaps; Fig. 15 is a plan view of the mechanism for folding the two side flaps; Fig. 16 is a vertical section in the line 16—16 of Fig. 15; Fig. 17 is a plan view of the portion of the mechanism which folds one of the side flaps; Fig. 18 is an end view of the ejection chute and mechanism for operating the plunger therein and folding the side flaps; Fig. 19 is a similar view illustrating the moving parts in a different position; Fig. 20 is a rear view illustrating the mechanism for folding one of the side flaps; Fig. 21 is a view, partly in plan and partly in horizontal section of the parts seen in Fig. 20, the line of section being indicated at 21—21 in Fig. 20; Fig. 22 is a perspective view of a slide which carries the roller which folds down one of the side flaps; Fig. 23 is a vertical section in the line 23—23 of Fig. 18; Fig. 24 is a perspective view of the ejection plunger; Fig. 25 is a plan view of the cam and head which operates the feed plunger; Fig. 26 is a plan view of the cam which actuates the front and rear flap knockers and folders; Fig. 27 is a plan view of the cam and head which actuates the ejection plunger, and Fig. 28 is a plan view of the cam and head which actuates one of the side flap folders.

The machine thus illustrated is the preferred form of my device and is adapted more particularly for the closing of the top flaps of filled cartons. It will be obvious, however, that many of the devices could be used equally well in connection with a machine for closing the bottom flaps of empty cartons which are placed upon suitable mandrels in the machine. This would necessitate more or less reorganization of the machine; but the change from one type to another is so well known, by mechanics skilled in this art, as to be readily effected. Therefore, by particularly describing a top flap-closing machine, I do not intend to limit myself specially thereto.

For clearer understanding of the details of construction which will be hereafter set forth, I shall proceed now to give a general description of the mode of operation of my device, so that when the specific devices are taken up, their position in the organized machine and their relation to the other parts will be readily apparent.

In the first instance, the packages are fed to the machine by means of a feeding device substantially similar to that shown, described, and claimed in my Patent Number 733,506. In this feeding mechanism, the packages come down a long feed trough, which usually extends the whole length of the packing room in a factory, and in which the various employees place the packages as rapidly as they are filled. As the packages arrive at the machine, they are thrust transversely from this feed trough into a feed chute through which they move with a step-by-step movement. In the device here shown, the packages take three steps for their movement through this feed chute, each package or carton being moved forward by the one behind it. At the conclusion of the second step of movement through this trough while the carton is standing still, two end flap knockers swing together on the end flaps and move them into proper position to be further operated upon. This matter will be best understood by reference to Figs. 13 and 14, which show the exact change which is produced by these knockers. In setting up and filling the cartons, the operator usually exercises no special care and the flaps may be in almost any position when the machine is reached. The first folding operation is to fold down the end flaps and if the carton is in the position shown in Fig. 13, with the side flaps inside the end flaps, the entire upper end of the carton will be distorted if an attempt to fold the end flaps is made, for the reason that the side flaps will be crushed down with the end flaps. The knockers strike the more or less elastic end flaps near their upper ends at the center, and drag them inside the side flaps as shown, (Fig. 14). This is readily effected when the end flaps are struck near their centers and toward their upper ends, for they then bend forward at the centers, changing their lateral extent. When the cartons pass the knockers, they reach on their next step, a position underneath a pair of end flap-folders which fold down the two end flaps, thus giving a closure to the contents of the carton. This folder is fully shown, described and claimed in the patent to myself and G. H. Cormack, Number 733,510, and its operation will be perfectly obvious therefrom. Immediately after the front and rear flaps are folded, a continuously-moving vane strikes the carton, carrying it through an operating trough where glue is applied to the inside surfaces of the upwardly-projecting side flaps. As the carton nears the end of the operating trough the first side flap is folded down by means of a roller, which moves transversely of the trough to fold the flap and moves longitudinally with the carton, so as to have no longitudinal sliding thereon. This folding mechanism is a specific form of the mechanism claimed in my Patent Number 787,696, but differs considerably from the mechanism there shown and described in many particulars, and may be said to be an improvement thereon. Immediately after the first side flap is folded as aforesaid, the carton is shifted sidewise by suitable mechanism into a delivery trough, the top of which is composed of a plurality of heavy rollers, the first of which strikes the second side flap and folds it down and the remainder of which press the flaps until the glue is set. The conveying vanes, in the meanwhile, continue in motion, and eventually return to position to engage another carton and convey it through the operating trough.

Referring now to the drawings, A, is a suitable frame of any desired form, in which is journaled a transversely-extending driving-shaft, $A^1$, (Fig. 5). Loose upon the shaft, $A^1$, is a sprocket, $a$, which can be thrown into engagement with the shaft by means of a clutch, $a^1$. The sprocket, $a$, is connected by a chain, $a^2$, to a second sprocket, $a^3$, on a second shaft, $A^2$, likewise extending transversely of the machine. This shaft $A^2$, bears a miter gear, $a^4$, in mesh with a miter gear, $a^5$, upon a vertical shaft, $A^3$, (Figs. 3, and 5) journaled in the frame near one end. The miter gear, $a^5$, is in mesh with a smaller miter gear, $a^6$, on a shaft, $A^4$, extending longitudinally of the machine, the opposite end of said shaft, $A^4$, carrying a miter gear, $a^7$, in mesh with a miter gear, $a^8$, on a vertical shaft, $A^5$. The shaft, $A^4$, also carries a miter gear, $a^9$, in mesh with a gear, $a^{10}$, on a vertical shaft, $A^6$. The gluing wheel of my device is driven from the shaft, $A^1$, as will hereafter be explained in detail, while the remaining devices are driven by the other shafts set forth. Therefore, by throwing the clutch, $a^1$, all the driving shafts, but that moving the gluing wheel can be stopped simultaneously, without affecting the glue-wheel, which will keep on running until the driving shaft, $A^1$, is stopped.

Referring now to Fig. 1, which is a plan view of the mechanism, B, is the feed conveyer or belt running in a trough of suitable height to hold the cartons upright. The sides of this trough are constructed of small rails, $b$, (Figs. 1 and 2) and the belt runs in the proper direction to convey the cartons to the machine. $B^1$ (Figs. 1, 4 and 9) is a reciprocating plunger, which forces the cartons transversely from the feed conveyer, B, through a feed chute, $B^2$, (Fig. 1) and eventually under the front and rear flap folding mechanism. This feeder is practically the same as that shown, described, and claimed in my Patent Number 733,506, and only a brief description of it will be necessary. The mechanism is illustrated in Fig. 9, where it will be seen that the continually reciprocating member, $B^3$, to which the plunger, $B^1$, is intermittently connected, is connected to a slotted head, $b^3$, (Fig. 25) having a roller running in a cam slot in a cam wheel, $b^1$, mounted on the vertical shaft, $A^5$. The head, $b^3$, is guided by a block, $b^2$, to move transversely of the machine, so that by the rotation of the shaft, $A^5$, the member, $B^3$, is reciprocated. It is evident that when the plunger, $B^1$, is connected to the reciprocating member, $B^3$, as set forth in the patent referred to, the packages will be successively pushed transversely from the feed trough and will pass into the feed chute, $B^2$. The feed chute is of sufficient length to contain two cartons and each carton in its movement presses forward the one in front of it, the cartons thus moving with a step-by-step movement. When a carton makes its third movement forward, it reaches the head of the operating trough where it is operated upon by the front and rear flap folders. This mechanism is that shown, described and claimed in the patent to myself and G. H. Cormack, Number 733,510. C, C, are the moving vanes of this folder which come into contact with the front and rear flaps of the cartons, and they are actuated by means of links, $c$, connected to arms, $c^1$, mounted on shafts, $c^2$, journaled in a standard, $c^3$, said shafts bearing upon their opposite ends segmental pinions, $c^4$, (Fig. 10) in mesh with each other, one of the pinions being furnished with an arm, $c^5$, connected to a link, $c^6$, the opposite end of which is connected to a vertically-reciprocating head, $c^7$, (Fig. 10) carrying a roller, $c^8$, engaged by a spiral cam, $c^9$, on the vertical shaft, $A^5$. The rotation of the shaft, $A^5$, reciprocates the head, $c^7$, rotates the shafts, $c^2$, and consequently swings the vanes to fold the front and rear flaps.

As already set forth, in discussing the general operation of the machine, the front and rear flaps are operated upon by knockers which adjust the flaps when they have made their second forward movement in the feed chute. These knockers are illustrated in Fig. 11 where it will be seen that they consist of two arms, $C^1$, pivoted together and to the standard, $c^3$, at, $c^{10}$, each of said arms having at its lower end a curved contact piece, $C^2$, (Fig. 12) which is adapted to come into contact with the carton flaps. The arms, $C^1$, have near their upper ends laterally-projecting guideways formed by laterally-projecting fingers, $c^{11}$, between which fingers run pins, $c^{12}$, mounted on the arms, $c^1$, of the folding mechanism. It will be seen that as the folding mechanism is operated in the direction to lower the folding plates, the pins, $c^{12}$, swing downwards and cause the contact pieces, $C^2$, to approach each other and strike the carton flaps. The folding vanes and knockers are laterally separated by a distance equal to the width of the carton, so that while the folding vanes are operated by one carton, the knockers will be operating upon the next succeeding carton.

After the cartons have been operated upon by the first folding mechanism, they are engaged by the conveying mechanism and moved down through the machine. This conveying mechanism will now be described. The shaft, A³, carries at its upper end a sprocket wheel, D, over which—and an idler sprocket, D¹, at the opposite end of the machine—runs a sprocket chain, D². This chain carries with it a plurality of carton carriers, D³, comprising horizontal plates, D⁴, (Figs. 3, 7 and 8) each of which has on its upper face, a block, d, having a round forward end, d¹, (Fig. 6). At the forward end of each block is a shaft, d², upon which is journaled one end of a paddle, d³, having secured to it a rearwardly-projecting arm, d⁴, which contacts with a pin, d⁵, on the block, d, to limit the forward swing of the paddle. The backward swing of the paddle is limited by engagement of the paddle proper with said pin. It will thus be seen that the paddle can be swung from a position at right angles to the conveyer chain, to a position parallel with and approximately in the vertical plane of the conveyer chain. Paddles in these two positions can be seen in Fig. 1, the paddles at the left-hand end of the figure being shown in their forward position and the paddles at the right-hand end being shown in their backward position, and one of the paddles being shown just as it is swinging forward.

The plates, D⁴, run on tracks, d⁶, at the rear of the machine and their weight is thus removed from the chain. In this portion of their travel, the plates and paddles are accomplishing no useful function, and no particularly active guiding means are necessary. Similarly, when passing about the sprocket wheels, the plates are guided only by the wheels themselves, which give the chain a special rigidity in these places. On the other hand, while the plates are passing through the operating trough, special guiding mechanism is very desirable and this mechanism is shown in Fig. 6, where it will be seen that rails, D⁵, D⁶, are provided, having grooves, d⁷, to receive the edges of the plates, D⁴. By this means, the plates and paddles are given a very rigid path through the machine. The rails, D⁵, D⁶, are supported by transverse members, A⁷, of the frame, A, of the machine. The rail, D⁵, is provided with a rabbet, d⁸, which receives and guides one of the lower corners of the carton and a smaller rail, D⁷, rabbeted at, d⁹, is provided to receive the opposite corner of the carton. The rail, D⁶, is beveled off at, d¹⁰, (Fig. 4) at the upper end of the machine to receive the plates, D⁴, when guided to position. Beside the rail, D⁶, and slightly higher than the same is a rail, D⁸, arranged to engage with the arms, d⁴, on the paddles. By this means, the plates are guided into the operating trough and as they enter it, the arms engage the rail, D⁸, holding the paddles rigidly across the operating trough during their passage therethrough. It will be seen that the paddles reach this position at right angles to the trough by the time the end flap-folding mechanism is reached and that consequently the paddles are in position to engage and move forward the cartons. The carton-conveyers are so spaced on the chain and the speed of the sprocket-wheels—which carry the chain—so arranged, that one of the paddles reaches the end flap-folding mechanism immediately after the same has been operated each time and before the flap-folding vanes are raised. The paddles thus strike the cartons and slide them from under these vanes, the vanes remaining in position and holding the flaps down until the cartons have passed from under the vanes. When the cartons slide out from under the vanes, they pass under a sheet-metal plate, E, which forms the top of the operating trough and operates to hold the front and rear flaps in their folded position while the side flaps are operated on.

In its passage through the operating trough, the carton first passes under a gluing wheel, F, driven by a chain, f, running over a sprocket wheel, f¹, on the driving shaft, A¹, of the machine. The glue-wheel is journaled in suitable brackets mounted upon longitudinally-extending members, A⁸, of the frame, A, these members, A⁸, being supported at the top of the operating trough by posts, A⁹. This wheel revolves through a glue-pot, F¹, and its operation is to spread glue over the inner faces of the side flaps of the carton, this operation being assisted by means of presser rollers, F², (Figs. 2 and 6) geared to rotate at the same surface speed as the gluing wheel. This mechanism has been fully set forth and described in the patents heretofore referred to in the course of this specification, and no special description of it will be necessary here. After passing the gluing wheel, the first side flap of the carton is next operated upon. The mechanism for folding this flap is illustrated in Figs. 15, 16, 17, 18, 19, 20 and 21. G, (Figs. 15, 16, and 22) is a longitudinally-movable slide supported on the frame of the machine. Bolted to the lower face of this slide is a block, G¹, (Figs. 16 and 22) which extends down through a slot in one of the members, A⁸, in the frame of the machine and serves to guide the slide, G, so that it moves only longitudinally. The lower end of this block is guided upon a rod, g⁸, connected by a link, g, to one end of a lever, G², of the first order, fulcrumed to the frame of the machine. The opposite end of the lever is connected by a link, g², to a slotted head, g³, guided on a block, g⁴, and longitudinally reciprocated by means of a roller, g⁵, running in a cam-slot on a cam, g⁶, mounted on the vertical shaft, A⁶, heretofore described. It will be evident that as the driving-shafts of the machine are rotated, the lever, G², will be oscillated and the slide, G, will be reciprocated longitudinally. The slide, G, has at its ends perforated ears, g⁷, in which slide rods, h, between the forward ends of which is supported a roller, H. The rods, h, are connected together between the ears, g⁷, by means of a bridge, H¹, carrying a roller, h¹, which runs in a central slot, i, in a slotted arm, I, pivoted at i¹, to the frame of the machine. It will be seen that when the parts are in the position shown in Fig. 15, that if the slide, G, be drawn toward the lower end of the machine, the bridge, H¹, will be moved forward by engagement of the roller, h¹, with the slot, i, in the arm, I, thus drawing the roller forward and folding down the side flap of any carton which may be in position to be operated upon. If the roller is moved longitudinally at the same speed as the carton, each portion of the surface of the roller will swing down on the corresponding portion of the carton flap without any longitudinal movement with respect to the carton. This is substantially the operation of the device, the longitudinal movement of the roller being timed to occur just as a carton is passing the position occupied by the roller. The roller could obviously be returned to position along the same course which it took in moving forward and downward; but in high-speed machines, there are certain reasons, which will presently be explained, which will make such movement undesirable. I therefore move the roller forward and toward the lower end of the machine, as above set forth, then swing the arm, I, backwards about its pivot by mechanism which I shall presently explain, and then move the slide, G, and roller, H, toward the upper end of the machine together. The roller thus traverses a course roughly triangular in form, moving first diagonally forward and downward, then moving straight backward and then moving upward.

The free end of the arm, I, is connected by a link, $I^1$, to one end of a lever, $I^2$, of the first order, pivoted to the frame of the machine. The opposite end of the lever, $I^2$, is bifurcated, having two ends, $i^2$, $i^3$, adapted to be engaged by a roller, $i^4$, attached to the ejection plunger, which I shall hereafter describe. It will be understood that the ejection plunger reciprocates transversely in the machine to force out the cartons and that consequently the roller, $i^4$, alternately strikes the two ends, $i^2$, $i^3$, at the lower end of the lever, $I^2$. It will also be seen that the roller, $i^4$, has considerable lost motion and that therefore, the arm, I, will stand still in each of its two positions for a considerable period before moving. When the ejection plunger moves backward after operating on one carton, the roller, $i^4$, presently strikes the rear end, $i^3$, of the lever, $I^2$, thereby causing the arm, I, to swing forward. At the same time the roller, H, is in its extreme position toward the head of the machine and just starting to move down, and simultaneously a carton is passing the roller under the influence of one of the conveying paddles. As the arm, I, is moved forward, the roller is propelled toward the lower end of the machine, moving at the same speed with the carton, and is, by engagement of the roller, $h^1$, with the slot, $i$, moved forward so as to fold the first side flap of the carton. This diagonal movement of the roller continues until the carton reaches the end of the operating trough when the flap is completely folded down, the roller occupying the position shown in Fig. 16. In the meantime, the ejection plunger has been completely retracted, so as to be out of the way of the carton. Thereupon the ejection plunger again moves forward and presently strikes the end, $i^2$, of the roller, $I^2$, thereby swinging the arm, I, backwards until its slot is parallel with the operating trough. Thereupon the slide, G, is moved upwards along its path, the roller being thus returned to its original position. It will be understood that while the roller is returned to position, a second carton has moved down into position to be operated upon by it, and that were it not for the fact that the roller returns to position in a path parallel to the operating trough, it would contact with the carton. The roller is given this peculiar triangular course, in order to prevent it from coming into contact with and destroying the next carton in its return movement.

Heretofore I have referred, at more or less length, to the ejection plunger, but have given no detailed description of it, the reference thereto being merely made to show the operation of the first side flap folder, which is operated in part by the ejection plunger. The plunger itself will now be particularly described. The plunger is illustrated in Fig. 24, where it will be seen that it consists of a transverse plate, J, guided (Fig. 23) to move transversely in the frame of the machine. The rear end of this plate carries a longitudinally-extending contact piece, $J^1$, which, when the plate, J, is reciprocated in its guideway, moves across the lower end of the operating trough and is adapted to engage with the rear face of the carton in such movement. Bolted to the plate, J, is a downwardly-extending bracket, $J^2$, (Figs. 18 and 19) which carries the roller, $i^4$, already referred to, and also serves as an attaching point for one end of an arm, $j$, extending longitudinally from a slotted head, $j^1$, (Fig. 27) guided to move transversely of the machine and carrying a roller, $j^2$, engaging with a slot in the cam-wheel, $j^3$, mounted on the vertical shaft, $A^6$. The rotation of this shaft when the machine is in operation reciprocates the slotted head $j^1$, and consequently causes the reciprocation of the plate, J, and contact piece, $J^1$, which together form the ejection plunger. The space beside the path of the plate, J, into which the ejection plunger forces the cartons is provided with suitable guides, $A^{10}$, to receive the same, and may be termed an ejection trough. The cartons, when operated upon by the ejection plunger, move forward into this trough and the second side flap is folded by means which will presently be described.

I shall now describe the action of the conveying paddles as they pass the ejection trough and ejection plunger. It will be noted (Fig. 4) that the rail, $D^8$, which holds the paddles in position at right angles to the operating trough during their movement therethrough, terminates just above the ejection trough, so that the paddles are set free to swing back to the side of the conveyers as illustrated at the right-hand end of Fig. 4. The rail, $D^8$, is provided at its lower end with a curved portion, $d^{11}$, against which pins, $d^{12}$, (Fig. 6) strike to prevent too quick a swing of the paddles. This curved portion and the coöperating pins on the paddle arms result in a comparatively easy swing of the paddles from the position shown at the left-hand end of Fig. 4, to that of the right-hand position. It will be evident that just as the paddles are set free from the rails, $D^8$, they strike the ejection plunger which is just beginning its advance across the end of the operating trough. The paddles then swing out of the way, permitting the complete traverse of the operating trough by the plunger. It is evident that were it not for the hinged construction of the conveying paddles or some equivalent construction, the conveyers would make it impossible for the present type of ejecting means to be used. I consider it particularly desirable to use a continuously moving carton-conveyer, for by this means greater speed of operation can be obtained. I also consider it highly desirable to remove the cartons from the operating trough at right angles and use a comparatively quick movement, for by this means the simplest and most perfect device for folding the last flap can be used. Heretofore it has been customary in continuous conveyer machines, either to run the cartons off the conveyer as it goes around the wheel at the end, or to provide a plurality of ejecting plungers which move with the carriers and are operated as they pass predetermined points. I believe it to be novel to use a single ejection plunger which operates successively on the various cartons carried by continuously-moving propelling members. I also believe it to be novel in such a structure to arrange the propelling and ejection devices so that the movement of the carton is instantaneously changed from a longitudinal to a transverse movement.

The top of the ejection trough is composed of a plurality of rollers, K, journaled in transversely-extending members, A¹¹, of the frame, the trunnions of which have a limited vertical movement in notches provided for the purpose at the upper edge of the ejection trough (see Figs. 18 and 19). The rear roller, K¹, is very small, the next roller, K², is somewhat larger and the remaining rollers are all of considerable size and weight. As the cartons are shifted transversely of the machine by the ejection plunger, the second side flap strikes the first roller, K¹, and is folded down, its interior glued surface being kept out of contact with the roller, G, by means of a guard, L, of wire or the like, (Figs. 15, 16, 18, and 19). The carton passes the first roller under the influence of the plunger and remains under the second roller until another carton is passed into the trough, when it moves on forward through the trough, being kept continuously under pressure until its glue is set. It will thus be seen that after the package passes the gluing wheel, the side flaps are operated upon only by rollers which move across the flaps in such a position that there is no sliding upon said flaps, but only a rolling motion. This is particularly desirable as it prevents twisting of the folds and also prevents any possible marring of the printed matter which is usually placed on the last side flap, but in some types of carton, appears on both side flaps. This concludes the description of the mechanical structure of the machine. The general operation of the same has been fully pointed out in the earlier portion of the specification, so that a general idea of the operation can be obtained therefrom. The operation of the various parts has been dealt with in detail and no capitulation of the entire operation will now be necessary.

I am aware that various modifications of the device herein shown can be made, and also that certain subcombinations can be used without the employment of other portions of the device. I do not therefore intend to limit myself to the particular mechanism herein shown and described, except as pointed out in the claims.

I claim as new and desire to secure by Letters Patent:—

1. The combination with mechanism for advancing cartons through a portion of their course with a step-by-step movement, of a pair of knockers arranged to engage the end flaps of a carton, mechanism for operating the knockers, while the cartons are standing still between forward movements, and mechanism for folding the end flaps at a subsequent stage of their movement.

2. The combination with carton-advancing mechanism, of a pair of knockers, of less width than the end flaps of a carton and in position to engage them toward their upper ends, and mechanism for operating the knockers to arrange the end flaps inside the side flaps preparatory to further folding.

3. The combination with mechanism for advancing a carton step-by-step through a portion of its movement, of a pair of knockers arranged in a position beneath which the cartons are stationary in such movement, and mechanism for operating the knockers.

4. The combination with mechanism for advancing a carton step-by-step through a portion of its movement, of a pair of knockers arranged in a position beneath which the cartons are stationary in such movement, mechanism for operating the knockers, and means for folding the front and rear flaps after the operation of the knockers.

5. The combination with mechanism for advancing cartons step-by-step through a portion of their movement, of a pair of knockers in a position beneath which the carton comes to rest in such movement, the knockers being adapted to engage with the end flaps of the carton to move them within the side flaps, mechanism for operating the knockers while the cartons are at rest, and means for subsequently folding the front and rear flaps.

6. The combination with mechanism for advancing cartons step-by-step through a portion of their movement, of a pair of knockers in a position beneath which the carton comes to rest in such movement, the knockers being adapted to engage with the end flaps of the carton to move them within the side flaps, mechanism for operating the knockers while the cartons are at rest, said knockers being of less width than the end flaps and being constructed and arranged to strike them near their free ends, and means for subsequently folding the front and rear flaps.

7. The combination with carton-conveying mechanism, and mechanism for folding the front and rear flaps, of knockers having ends spreading toward their extremities, and curved away from each other, said knockers being constructed and arranged to strike the end flaps toward the tops with their narrow curved portions to push the same inside the side flaps.

8. The combination with a step-by-step conveying mechanism moving the cartons through a portion of their course, and mechanism for folding the end flaps while the cartons are stationary in one position, of knockers arranged over the resting place of the cartons in a preceding position, means for operating the folding mechanism, and means of connection between the knockers and the folding mechanism, whereby the knockers are operated synchronously with the folding mechanism.

9. The combination with a plurality of continuously-moving carton propelling bodies, of a single device operating successively on the cartons carried thereby to shift the cartons from the path of said bodies.

10. The combination with a plurality of continuously-moving carton propelling paddles, traveling in a predetermined path, of a single device operating upon the successive cartons to move them from the path of said paddles.

11. The combination with a plurality of continuously-moving carton propelling bodies, of a single device operating successively upon the cartons carried by said bodies, to shift them at right angles to the course of said bodies.

12. The combination with a plurality of continuously-moving carton propelling paddles arranged to push cartons through a folding machine, of a single device operating successively upon the cartons to shift them at right angles to the course of the paddles.

13. The combination with a plurality of carton propelling bodies arranged to move cartons through a folding machine, of an ejection plunger reciprocating transversely to the course of said bodies and means for releasing the cartons from the bodies when they reach the path of the ejection plunger.

14. The combination with a plurality of carton propelling bodies arranged to move cartons through a folding machine, of an ejection plunger reciprocating transversely to the course of said bodies, means for releasing the cartons from the bodies when they reach the path of the ejection plunger, and for simultaneously moving the carton propelling bodies from the path of the ejection plunger.

15. The combination with a continuously-moving, flexible, power-transmission device, of a plurality of paddles pivotally secured thereto, means for holding the paddles at right angles to the power-transmission device during a portion of their movement to propel cartons, and an ejection plunger, said holding means being constructed and arranged to release the paddles to permit them to swing into a position parallel with the flexible power-transmission device when the cartons reach the path of the ejection plunger.

16. The combination with a continuously-moving, flexible, power-transmission device, of a plurality of paddles pivotally secured thereto, devices for holding the paddles at right angles to the power-transmission device during a portion of its movement to propel cartons, means for releasing the paddles and permitting them to swing back into a position parallel with the transmission device at a predetermined point in their movement, and an ejection plunger reciprocating transversely to the course of said paddles in position to engage cartons when the paddles are released.

17. The combination with a continuously moving flexible, power-transmission device, of supports secured at intervals thereto, paddles pivotally mounted on said supports, arms extending backwards at right angles to the paddles, a rail against which said arms bear during a portion of their movement, whereby the paddles are held at right angles to the flexible power-transmission device, and an ejection plunger reciprocating across the path of the paddles at a point beyond the end of said rail, whereby the paddles are enabled to be swung out of the path of the ejection plunger, to permit its operation.

18. The combination with a conveyer, of a side flap-folder adapted to operate successively upon the cartons carried by different parts of said conveyer and mechanism for shifting the folder longitudinally with the conveyer, and at the same speed thereof and simultaneously moving the folder horizontally across the path of the conveyer.

19. The combination with a conveyer, of a side flap-folder, adapted to operate successively upon the cartons carried by different parts of said conveyer mechanism for moving the same in a horizontal plane, longitudinally with and at the same speed as the conveyer and laterally over the path of the conveyer.

20. The combination with a conveyer, of a side flap-folder, and mechanism for moving the side flap-folder in a horizontal plane first in a diagonal line with the conveyer, and at the speed thereof, and across its path, subsequently retracting the conveyer laterally and subsequently returning the folder in a line parallel to the path of the conveyer.

21. The combination with a conveyer, of a roller whose axis is parallel with the path of the conveyer, and mechanism for moving the roller simultaneously with the conveyer and at the speed thereof and also across the path of the conveyer to fold a side flap.

22. The combination with a conveyer, of a slide and means for moving the slide longitudinally with and at the speed of the conveyer, a roller guided to move transversely in the slide, a swinging guide engaging with the roller and mechanism for swinging said guide to determine the transverse movement of the roller.

23. The combination with a conveyer, of a transversely moving folder for the first side flap, a roller, means for shifting the carton transversely under said folder to fold the second side flap, and a guard arranged to prevent the inner faces of the second side flap from contacting with the first side flap folder.

24. In a device of the class described, the combination with a plurality of continuously moving carton-propelling bodies, each of which lies behind a carton to convey the same forward, of a single device arranged to operate upon the successive cartons to shift them laterally from the path of said bodies.

25. In a device of the class decribed, the combination with a plurality of continuously moving carton-propelling bodies, each of which lies behind a carton to convey the same forward, of a single device capable of moving only at right angles to the direction of movement of said carton-propelling bodies and adapted to intersect in its movement the imaginary solid generated by the movement of said body to shift the cartons laterally from the path thereof.

26. In a device of the class described, the combination with a continuously moving conveying body adapted to lie behind a carton to move it longitudinally, the carton during such movement lying partially in the imaginary solid described by the movement of such conveying body, of a single relatively immovable device adapted to cross the imaginary solid described by the movement of said conveying body and shift the cartons propelled thereby laterally from such imaginary solid.

In witness whereof I have signed the above application for Letters Patent at Rockford, in the county of Winnebago, and State of Illinois, this 7th day of July, A. D. 1905.

CHARLIE REDD.

Witnesses:
 FRANK A. TICKNOR,
 NELLIE E. ENNETT.